Feb. 26, 1946.  L. R. MANSELL  2,395,562
LENGTH CONTROL APPARATUS
Filed Jan. 6, 1945                    3 Sheets-Sheet 1

INVENTOR
LELAND R. MANSELL
BY
ATTORNEY

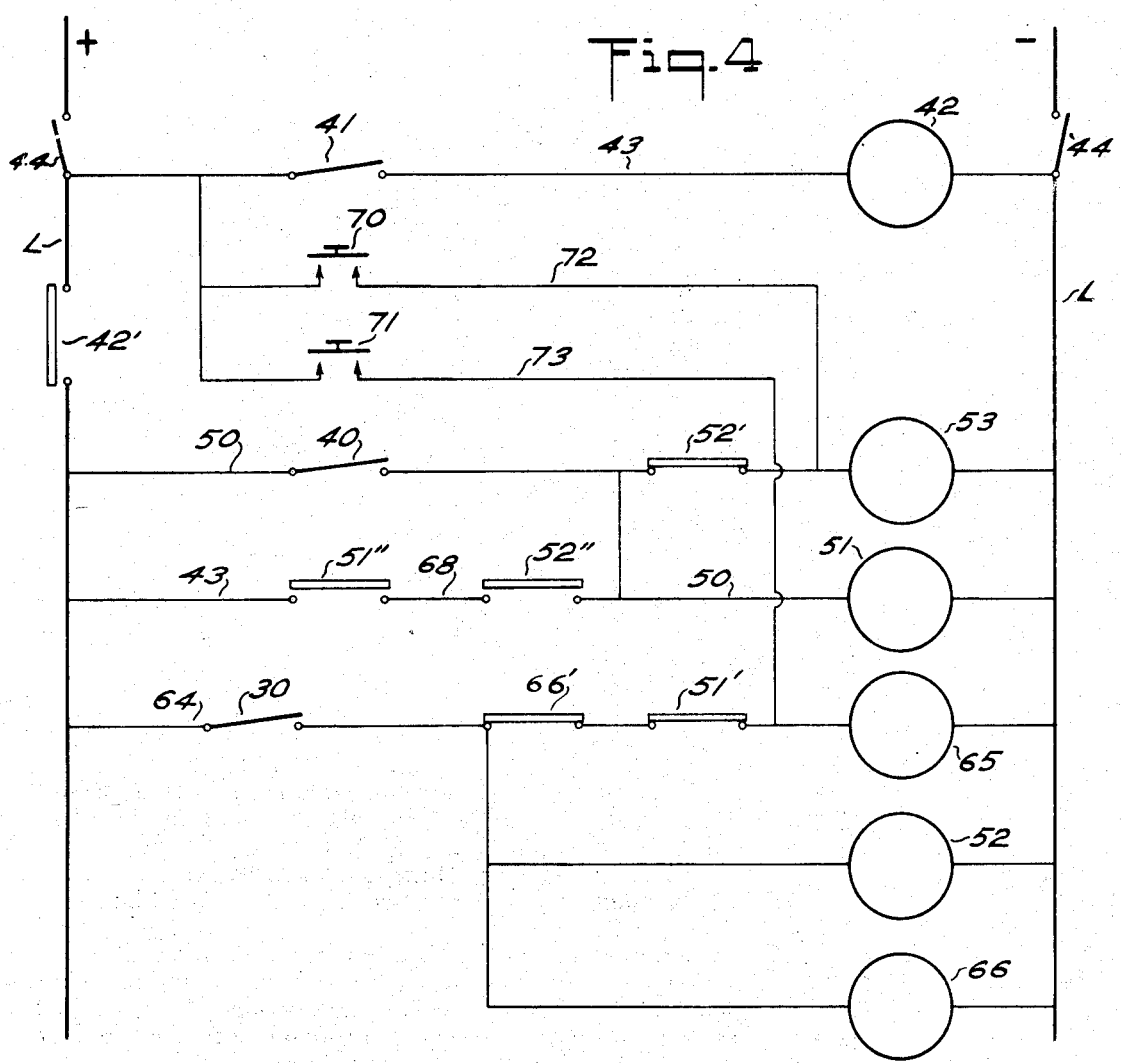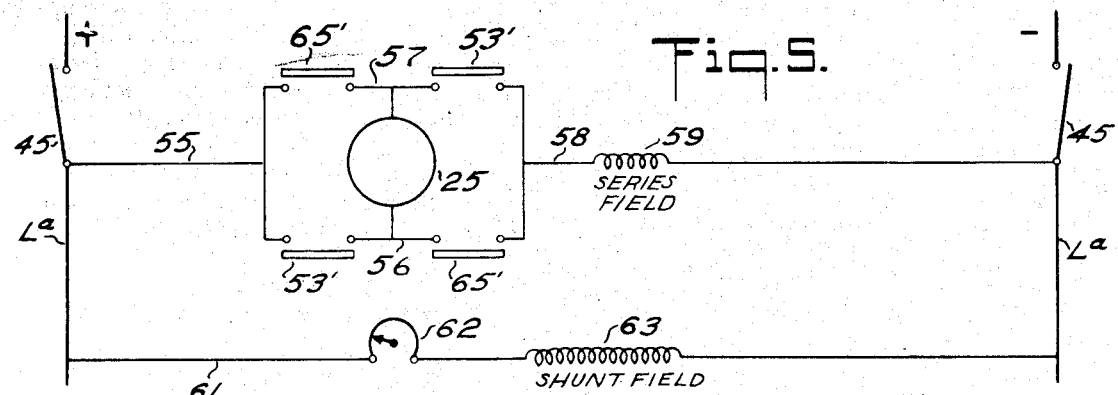

Patented Feb. 26, 1946

2,395,562

UNITED STATES PATENT OFFICE 2,395,562

LENGTH CONTROL APPARATUS

Leland R. Mansell, Poland, Ohio

Application January 6, 1945, Serial No. 571,579

11 Claims. (Cl. 29—69)

This invention is directed to the provision of apparatus for insuring cutting moving stock such as pipe, tubing, rods and the like into pieces of substantially predetermined length as the stock is continuously generated in a continuous mill or other apparatus, the invention also including further objects and novel features of design, construction and arrangement as will hereinafter more fully appear.

As it is particularly adapted for use in connection with the severing of butt weld pipe after its formation in a continuous butt weld mill, I shall describe the invention more especially when utilized for that purpose but not by way of limitation or restriction thereto as it may be employed advantageously for many other purposes and in connection with other kinds of stock if desired. It will moreover be understood that the term "pipe" is herein used in a generic sense to indicate any elongated generally like material such as rods or tubes as well as the class of goods specifically known as pipe.

Butt weld pipe as produced on a continuous mill is delivered from the latter at high speed and is usually cut into appropriate lengths at a point relatively close to that of its exit from the mill by some appropriate mechanism such as the flying saw disclosed in U. S. Patent 1,946,926, granted February 13, 1934, to J. M. Barton, to which reference may be had for a detailed description of the saw and its actuating mechanism. Speaking generally, however, such a saw is positioned adjacent the line of travel of the pipe upon a table movable parallel thereto and electrically controlled means are provided for moving it from a position of rest until it attains approximately the speed of the pipe at which time the saw is forced against the latter to sever it, after which the table is brought to rest and then returned to its first position preparatory to being again actuated to cut off the succeeding length of pipe. The motion of the table is initiated by contact of the leading end of the pipe with a flag switch positioned in its path at a point such that the time lag required between the actuation of the switch and the severing of the pipe by the saw is theoretically that which will result in the pipe being cut to the desired length of, say, 20 feet. In practice, however, unavoidable variations in operating conditions materially affect the length of the pieces consecutively cut in this manner so that desirable low length tolerances cannot with any certainty be obtained with a given setting of the flag switch. Thus, for example, slight changes in the speed of the mill, in the temperature of the furnace in which the skelp is heated, or in the thickness of the skelp itself, either alone or in combination, change the velocity at which the pipe emerges from the mill and as the time lag between actuation of the flag switch by its leading end and the operation of the saw upon it is constant, resetting of the position of the flag switch is required from time to time in an effort to effect the requisite compensation. But such resetting, if and when made, is necessarily in accordance with the judgment of the operator and it results that out of, say, 10,000 pieces of pipe, many are too short and others too long because following a change in operating conditions either the flag switch was not properly readjusted or was not readjusted at all.

In accordance with my invention I provide means whereby the flag switch controlling the operation of the saw is automatically shifted longitudinally of the pipe in one direction or the other to compensate for changes in operating conditions thereby insuring that a series of the severed pipes will be substantially of the same length irrespective of such changes, said means being further automatically operative to properly adjust the position of the flag switch when the length of the sections are to be increased or decreased, and also in their preferred embodiment, being so arranged that the position of the flag switch also can be manually altered if and when desired.

In the accompanying drawings to which reference may now be had,

Fig. 4 is a schematic diagram of the electrical control system preferably employed;

Fig. 5 is a schematic diagram of the flag switch motor circuit which for convenience of illustration is shown separately from the control circuit.

Like characters of reference are used throughout the drawings to designate the same parts.

Figure 1:
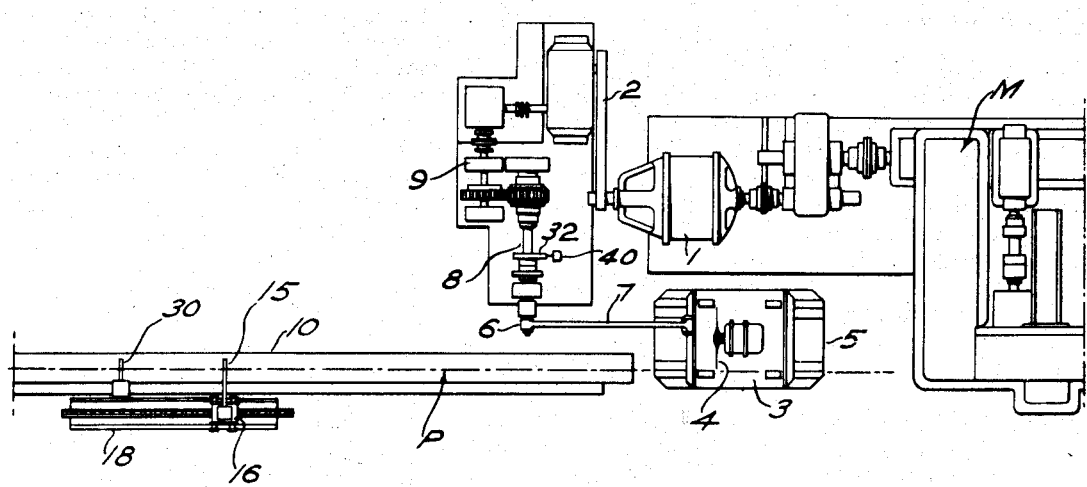
Fig. 1 is a substantially diagrammatic plan view of a portion of a continuous butt weld pipe mill and flying saw assembly of conventional design with the present invention operatably incorporated therein.
Figure 2:
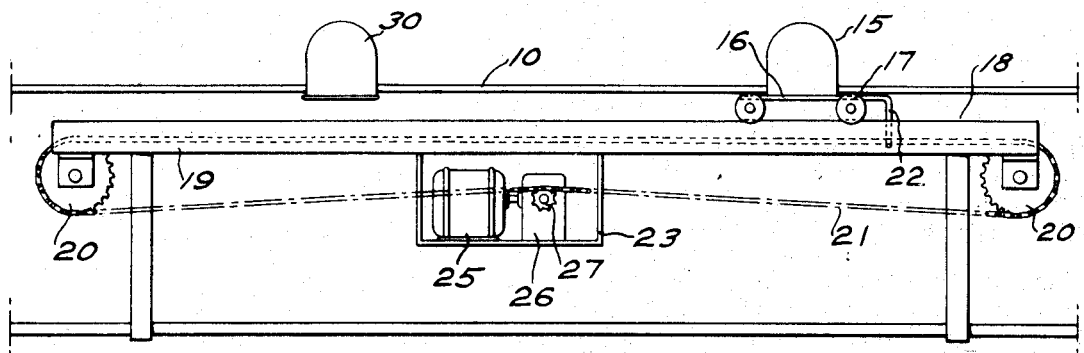
Fig. 2 is a side elevation on a scale greatly enlarged over Fig. 1 showing the saw flag switch and the means provided for moving it longitudinally of the pipe path.
Figure 3:
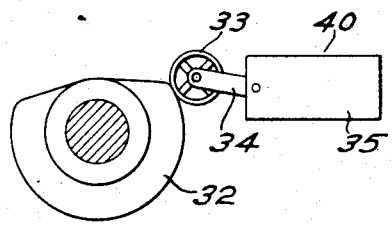
Fig. 3 is a still further enlarged end elevation of one of the switches utilized in the mechanism.
Figure 6:
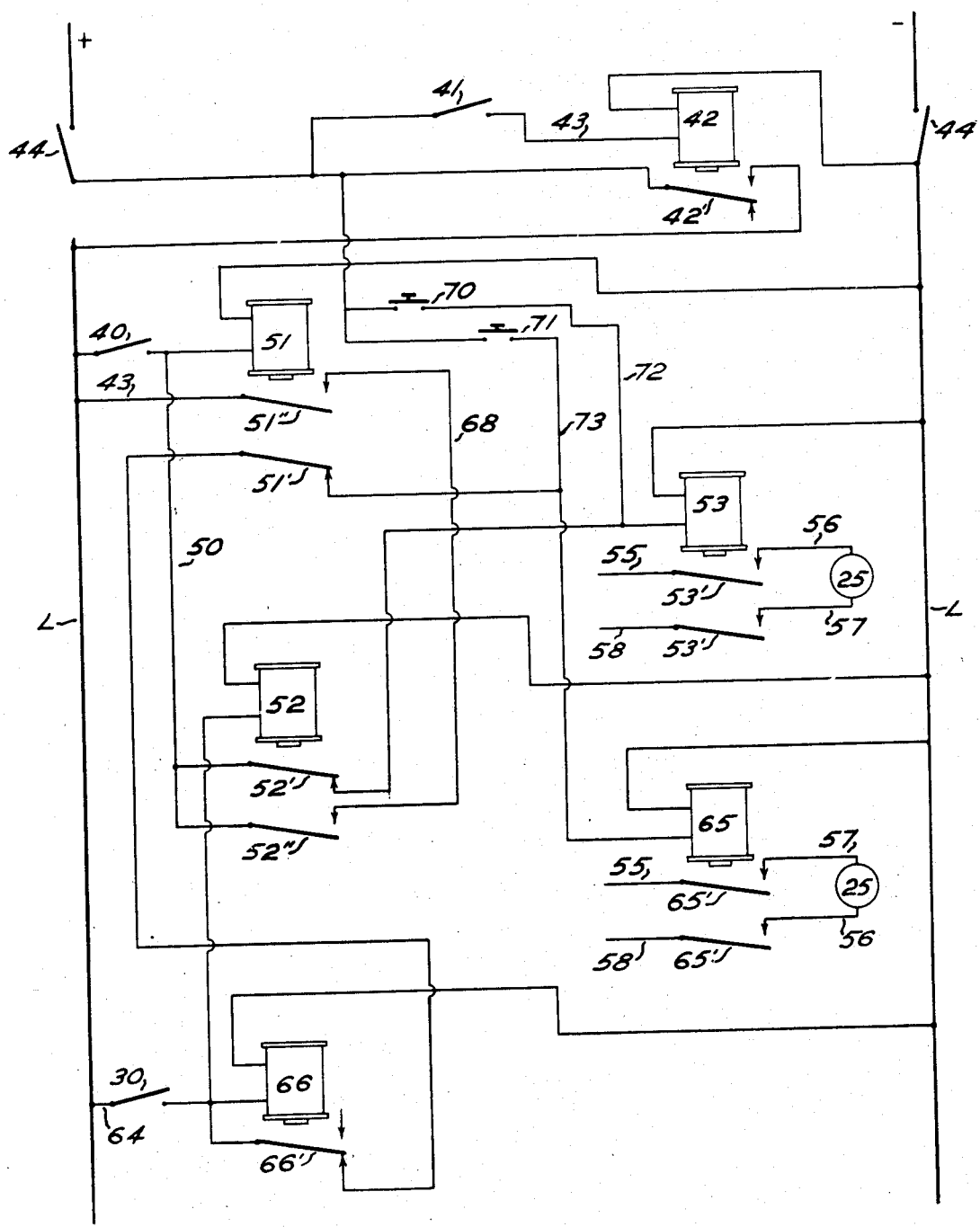
Fig. 6 is another schematic diagram of the electrical control system shown in Fig. 4 and in part in Fig. 5.

To facilitate a proper understanding of the invention I shall first describe certain mechanical details thereof as shown in Figs. 1–3 inclusive and then the preferred electrical circuits and connections schematically illustrated in the succeeding figures. Thus in Fig. 1 M designates generally a continuous butt weld pipe mill of any suitable construction which may be driven by a motor 1 which also, through the medium of a belt 2, supplies power for actuating the sliding table 3 on which the motor driven circular flying saw 4 is mounted. This table is arranged for reciprocation parallel to the path of the pipe on a base 5 through the medium of a crank 6 and pitman 7, the shaft 8 on which the crank is mounted being controlled by an electrically actuated clutch 9 by which it can be connected and disconnected through reduction gearing to motor 1. The pipe as it emerges from the mill moves past the saw to a conveyor 10 of suitable construction for carrying it in a direction away from the mill for ultimate reception on a cooling table or some other apparatus (not shown), and thus when the clutch is engaged with table 3 at that end of its travel nearest the mill, the table will be drawn with increasing speed in the direction in which the pipe travels along the path P, designated in dot and dash line, until it attains approximately the speed of the pipe at which time the saw is caused to move transversely so as to sever it and is then retracted as the table comes to rest at the opposite end of its stroke from which point the table is returned during the next half revolution of shaft 8 to initial position preparatory to cutting off the next piece of pipe. The operation of the magnetic clutch and hence of the saw are controlled, as hitherto mentioned, by a flag switch 15 which is customarily disposed in a fixed position in the path of the pipe so that when it is actuated by contact of the leading end thereof the clutch will be engaged and the saw operated to cut the pipe, all as more fully explained in said Patent 1,946,926. As such continuous butt weld pipe mills and flying saws are well known to and understood by those skilled in the art, further description thereof would be superfluous.

In accordance with my invention instead of supporting flag switch 15 upon or adjacent the conveyor in an operatively fixed position, I mount it upon a small carriage or buggy 16 provided with wheels 17 running on rails 18 on a bench 19 disposed adjacent one side of the conveyor at a suitable distance from the mill, the arm of the switch being extended sufficiently to overhang the path of the pipe. At each end of the bench is disposed a sprocket 20 over which passes a continuous chain 21 lying about midway between rails 18 and the buggy is provided with a downwardly extending dog 22 which engages in the upper run of the chain. Midway between the sprockets and beneath rails 18 is disposed a bracket 23 in which is supported a motor 25 driving through reduction gearing, generally designated as 26, a sprocket 27 which meshes with the lower run of the chain as best shown in Fig. 2. This motor is preferably of direct current reversing type and it will thus be apparent that depending on its direction of rotation buggy 16 and in turn saw flag switch 15 carried thereby will be moved in one direction or the other relatively to the conveyor so as to position said switch at a greater or lesser distance from mill M.

I also provide a second flag switch 30 manually slidable to and operatively securable by appropriate means in any desired position along the conveyor, this switch being termed the "pipe flag switch," and also another mechanically operated switch (Fig. 3) desirably comprising a cam 32 disposed on shaft 8 so as to rotate therewith and having a high point extending about two-thirds around its periphery and a low point covering the other third, this cam being cooperative with a roll 33 on a lever 34 extending into a switch box 35 in which suitable electrical contacts are located, this switch hereinafter termed the "saw shaft switch" being generally designated as 40. It will be appreciated that the specific construction of these switches is immaterial so long as they are adapted for the performance of their respective functions and that, consequently, flag switches 15 and 30 may be of the usual type comprising a rotatable arm extending over the path of the pipe with a depending vane or flag extending into it so that when struck by the leading end of the pipe the arm will be rotated in the switch box into which it extends so as to open or close the switch through mechanism enclosed in the box and when the flag, which may be suitably spring biased, is relieved of the thrust or support of the pipe it will return to vertical position and so reversely actuate the switch. Likewise, while for convenience switch 40 is usually associated with shaft 8 and so arranged that when follower 33 is on the high point of the cam the switch will be closed and when on the low surface thereof it will be open, it will be appreciated that with equal facility this switch may be associated with any other part of the saw actuating mechanism which is set and thereafter held in motion whenever the magnetic clutch is engaged.

Having thus described what may be termed the mechanical features of the invention, I shall now refer to the electrical instrumentalities through which motor 25 is caused to remain stationary or to be rotated in one direction or the other so as to correspondingly move saw flag switch 15 toward or away from the mill in accordance with the operating conditions then obtaining or for other reasons as will hereinafter appear.

To facilitate proper understanding of the operation of these instrumentalities and the assembly in general it should be borne in mind that to insure each section of the pipe being cut to proper length, its leading end must strike switch 15 sufficiently in advance of the actual cutting operation to compensate for the time lag intervening between the closing of the switch and the actual severing of the pipe for if the switch is closed too soon the length cut off will be shorter than that desired and vice versa. Further, as heretofore mentioned, even though the switch be positioned correctly for a given set of operating conditions, a change in the latter necessitates a change in its position to maintain equality of the length of the sections being cut off and this change, in accordance with my invention, is made automatically by effecting a movement of switch 15 whenever pipe flag switch 30 and shaft flag switch 40 do not close in synchronism as they do when the pipes are being cut to proper length.

Pipe flag switch 30 primarily determines the length of the sections to be cut and, assuming 20 feet for the latter, the switch is first positioned on the conveyor so it is exactly 20 feet from the saw blade when it attacks the pipe. Now if saw flag switch 15 should happen to be in exactly the proper position to enable a pipe of that length to be cut as, however, seldom occurs, it of course would be closed by the leading end of the pipe at the right time to bring the saw against the pipe just as its leading end reaches and closes switch 30 which, as stated, is then disposed 20 feet from the saw, and as switch 40 likewise closes through the revolution of shaft 8 at the same instant, no current would flow through motor 25, for reasons hereinafter explained, and switch 15 would not be shifted from its initial position. But if the pipe did not reach pipe flag switch 30 before the saw attacked it, the cut off length would be too short or if the pipe closed switch 30 too early, the cut off section would be too long and current would be immediately caused to flow through motor 25 so as to turn it in one direction or the other and correspondingly shift flag switch 15 toward the position it should properly occupy thereby insuring the next length being cut more nearly or even exactly to the predetermined standard of 20 feet. The circuits controlled by this switch and through which the saw table is set in motion when it closes are not illustrated or described herein as they form no part of my invention.

Motor 25 is preferably actuated by a 250-volt direct current but any current of suitable voltage, either direct or alternating, may be used for actuating the various instrumentalities by which the operation of the motor is controlled; conveniently, however, a 250-volt direct current also may be used for this purpose.

To facilitate description of the operation of these instrumentalities it will be assumed that pipe is being cut to 20' lengths and, consequently, that the operator's switch 41 is closed thus energizing the coil of relay 42 to close its contact 42' through lead 43 between the main feed lines L, L, as is always the case when the automatic control is in operation, and that line switches 44—44, 45—45 are likewise closed; further, that flag switch 30 is set exactly 20' from the position of the saw when making the cut and that flag switch 15 is at exactly the right distance from flag switch 30 so it is actuated by the leading end of the pipe at the proper time to enable switches 30, 40 to close synchronously as above described. This assumed condition I term for convenience the "ideal" one and under it as long as all factors remain constant the lengths of the consecutive sections of pipe will be cut to very close tolerances, the time lag between the closing of switch 15 and the cutting of the pipe being just equal to that required for the pipe to travel from it to switch 30.

Now let us suppose it is desired to increase the length of the sections to 21' which of course necessitates the manual shifting of switch 30 one foot farther to the left, considering the apparatus as shown in Figs. 1 and 2. This naturally disturbs the ideal condition for the leading end of the next section of pipe will close switch 15 too early, thus bringing the saw against the pipe before it can reach and close switch 30 with the result that the pipe will be cut too short. The closing of switch 40 almost as soon as the saw shaft or other part to which it is attached starts to turn after the closing of switch 15, results in a circuit being set up through lead 50 and thence through two parallel circuits, one through the coil of an interlocking relay 51 and to the other side of the feed line, and the other through the closed contacts 52' of relay 52 and through the coil of "longer" relay 53 to the other side of the feed line, thus closing the "longer" contacts 53' (Fig. 5) of relay 53 and thereby operating motor 25 in the direction necessary to move flag switch 15 toward flag switch 30 and hence away from the saw. As long as the circuit just described is maintained motor 25 is fed from its feed line La, La through lead 55, one of the "longer" relay contacts 53' (which is now closed), leads 56, 57, the other contact 53' and lead 58, having the motor series field 59 interposed therein, running to the opposite feed line La. The shunt field circuit of the motor is made from one feed line La to the other through lead 61, rheostat 62 and shunt field 63.

The movement of flag switch 15 so induced continues until the leading end of the section just cut off strikes and closes switch 30, switch 15 of course remaining closed as the trailing part of the pipe is still passing under it. Upon the closing of switch 30 a circuit is made through lead 64 to establish two parallel circuits, one through the coil of relay 52, thus opening its normally closed contact 52', closing its normally open contact 52" and breaking the circuit through the "longer" relay coil 53 which in turn opens the circuit through motor 25 and stops further movement of switch 15 in connection with that particular length of pipe. The other of said parallel circuits from lead 64 runs through the coil of timer or safety relay 66 to the other feed line but has no effect under normal conditions although it is completed during the time that switch 30 is closed, as the sole purpose of relay 66 is to operate after a considerable length of time has elapsed as would be the case should the contacts of switch 30 stick closed. Should this occur relay 66 will therefore close after a predetermined length of time and its normally closed contact 66' between conductor 64 and relay 65 will open and remain open so as long as the abnormal condition exists, thereby preventing a circuit to relay 65 and consequently eliminating any possibility of an erroneous correction through improper movement of switch 15. Relay 66 is therefore essentially a safety device since it operates only in case of an unusual condition.

As switch 40 makes contact, interlocking relay 51 closes, thus opening its normally closed contact 51' which prevents the contacts of the "shorter" relay 65 from closing when switch 30 closes, a material correction in the position of switch 15 having already been made through the operation of switch 40 as above explained. Inasmuch as switch 40 makes contact only during part of a revolution of the shaft with which it is connected, two normally open contacts 51", 52" are also closed by the action of their respective relays and thus by-pass the established circuit through switch 40 likewise with a view to preventing an unwanted correction, the by-pass circuit thus formed feeding from one of the lines L through contact 51", lead 68, contact 52" and lead 50 to relay coil 51 and thence to the opposite feed line.

As flag switch 30 is being held in closed position by the length of pipe just cut off, the described sequence will remain intact until it is released as the trailing end of the pipe clears it and thus while the first length of pipe is being cut off after flag switch 30 has been moved and is passing beneath that switch, flag switch 15 will have been shifted toward it for a considerable distance but usually not enough to bring it to proper relation therewith to establish the ideal condition.

In the interval of space, however, between the trailing end of this first length of pipe and the front end of the next length, switch 30 drops to open or rest position which breaks the circuit in lead 64, thus de-energizing relay 52 and opening its contact 52″ to de-energize relay 51. All the relay coils, except that of line switch relay 42, being now de-energized, the system is in condition for cutting the next piece of pipe and if the latter is still cut too short the sequence of described operations will be repeated to move flag switch 15 still closer to flag switch 30 and so cause the system to more nearly approach the ideal condition which is ultimately attained after one or more additional pieces have been cut.

It is thus apparent that after flag switch 30 has been manually positioned to increase the length of the sections being cut, the system is automatically effective to move flag switch 15 toward it by increments until the proper relation to cause switches 30, 40 to close simultaneously is established between the flag switches, all without any attention whatever on the part of the operator.

Assume, now, that after a suitable number of 21′ pieces have been cut, it is desired to return to the cutting of shorter pieces, for example 19′. To accomplish this the operator merely manually moves switch 30 toward the right in Figs. 1 and 2 so it will be at the proper distance, to wit 19′, from the saw when it cuts the pipe. In the first cycle after this re-positioning of switch 30 the leading end of the pipe will reach it too soon to permit its synchronous closing with switch 40, with the result that a circuit is established through the coil of "shorter" relay 65, thus closing its contacts 65′ (Fig. 5), to energize motor 25 which then turns in the reverse direction and moves switch 15 away from switch 30 and hence toward the saw. The closing of switch 30 also energizes relay coil 52 to open contact 52′ and thus prevent energization of the "longer" relay 53 on subsequent closing of switch 40, while as the circuits set up in connection with and the operation and function of relays 51, 65 are in general similar to those heretofore explained, further reference thereto is unnecessary at this point.

It results that a considerable correction in the position of flag switch 15 is made while the first length of pipe is passing under flag switch 30 and as its trailing end clears the latter the switch returns to normal or open position, thus opening the circuit through relays 65, 52 and 66 while the subsequent opening of switch 40 also breaks the circuit established through it to relay 51 so that the parts are returned to normal position. During the cutting of the next length of pipe and of ensuing lengths if necessary, further but progressively shorter movements of flag switch 15 are made in the same way until the said ideal condition is attained, after which any number of lengths will be cut to the proper length as determined by the setting of flag switch 30 as long as operating conditions remain constant.

But, as previously stated, these conditions often change because of variation in the temperature of the furnace in which the skelp is heated, the thickness of the skelp itself, the speed of the mill in which the pipe is generated and so forth as is well known to those familiar with the manufacture of pipe and like articles with the result that the velocity at which the pipe emerges from the mill may vary from time to time, and perhaps the most important aspect of my invention resides in its capacity to automatically compensate for these changes in velocity as and when they occur by slightly moving flag switch 15 in one direction or the other so as to preserve the proper relation between it and flag switch 30 and thus maintain extremely close tolerances in the length of the pipe sections being cut. More specifically, if for some reason the velocity at which the pipe emerges from the mill increases, its leading end will reach and close switch 30 earlier than it should and consequently the effect is the same, though in lesser degree, as that which follows a manual moving of switch 30 toward the saw, while if the velocity decreases the effect is the same, though in lesser degree, as that which follows a manual moving of switch 30 away from the saw. Upon the occurrence of such a change in velocity, however, the control system is effective to promptly alter the position of switch 15 so as to bring it into proper relation with switch 30 whereby the pipes will continue to be cut to the desired length, the system under these conditions functioning in exactly the same way as it would if switch 30 had been manually shifted a very small distance in either direction. Although the rate at which butt weld pipe is generated is usually of the order of 400′ to 600′ per minute, the control system is nevertheless so sensitive as to compensate for these changes virtually instantaneously whereby once the ideal condition is established for a given length thousands of pieces thereafter can be cut substantially to that length.

As far as I am aware no other system or apparatus hitherto proposed for controlling the length to which a plurality of sections of pipe or the like are cut is capable of maintaining substantial equality in their lengths either automatically or by manual control.

After flag switch 30 is manually moved to a new position to materially decrease or increase the length of the sections to be cut it is often desirable for the operator to be able to move flag switch 15 a generally corresponding amount so as to decrease the number of pipe sections which otherwise would be cut while switch 15 is being automatically brought to proper relation with switch 30 in its new setting, and I therefore preferably incorporate in the control system certain instrumentalities by means of which the operator can, manually effect an approximate setting of switch 15 under such conditions or move it to any desired position should some other occasion require. More particularly, therefore, I preferably mount on a suitable panel located adjacent the point at which the operator is stationed, two switches 70, 71 desirably of the push button type; conveniently the operator's switch 41 which is effective when closed to set the automatic control into operation may also be located on this panel. Switch 70 is connected in a lead 72 extending from one of the feed lines L to the coil of "longer" relay 53 and switch 71 in another lead 73 extending from that line to the coil of "shorter" relay 65, both of these switches being normally open. It results that when switch 41 is also open coils 53 and 65 can be selectively energized by manually closing switches 70 or 71 with consequent closing of contacts 53′ or 65′ as the case may be so as to cause motor 25 to turn and move flag switch 15 in the desired direction. Thus when line switches 44, 45 are closed to provide the necessary current to operate the control system and motor 25, the operator by means of switches 70, 71 can locate switch 15 in approximately the right position for a new setting of switch 30 and then by closing switch 41 place the system in condition for automatic operation.

While I have herein described one embodiment of my invention which has been found eminently satisfactory in use, I do not thereby desire or intend to restrict or confine myself specifically thereto as many changes can be made in the design, construction and arrangement of the mechanical and electrical instrumentalities employed and in the circuits by which the latter are controlled and actuated without departing from the spirit and scope of the invention as defined in the appended claims.

Having thus described my invention, I claim and desire to protect by Letters Patent of the United States:

1. In combination with a flying saw assembly adapted to cut continuously generated pipe into sections and including a switch in the path of the pipe for actuating the saw through engagement by the leading end of the pipe, a second switch in said path more remote from the saw than the first switch also adapted for actuation by said end, a third switch and means for actuating it following actuation of the first switch, means operable to shift the latter along said path in either direction, and control means interconnected with the second and third switches automatically operative to energize said shifting means whereby to move the first switch with relation to the second switch whenever the second and third switches do not operate in synchronism.

2. In combination with a flying saw assembly adapted to cut continuously generated pipe into sections and including a switch in the path of the pipe for actuating the saw through engagement by the leading end of the pipe, a second switch also adapted for actuation by said end disposed in and adjustable along said path beyond the first switch to a predetermined point with relation to the saw to thereby primarily determine the length of pipe to be cut off, a third switch and means for operating it following actuation of the first switch, means including a reversible motor adapted to shift the first switch relatively to the second switch, and control means interconnected with the second and third switches and including a pair of relays selectively adapted to energize said motor to so shift the second switch in one direction or the other whenever the second and third switches do not operate in synchronism during the cycle incident to the cutting of each section of pipe.

3. In combination with a flying saw assembly adapted to cut continuously generated pipe into sections and including a flag switch in the path of the pipe adapted to be closed by engagement by its leading end to set the saw into operation, a second flag switch likewise adapted to be closed by said end and for securement in fixed position in said path beyond the first switch and at a predetermined distance from the saw as it cuts the pipe to thereby primarily determine the length of the sections to be cut off, a third switch operable from the saw actuating means following closing of the first switch, means including a reversible motor operable to shift the first switch along said path relatively to the second switch, and control means interconnected with said second and third switches automatically operative to selectively energize the motor and thereby move the first switch to a new position whenever during the cycle incident to the cutting of each section of pipe the time at which the saw attacks the latter is improper to produce a section of the desired predetermined length.

4. In combination with a flying saw assembly adapted to cut continuously generated pipe into sections and including a flag switch in the path of the pipe for actuating the saw when engaged by the leading end of the pipe, a second flag switch adapted for securement in said path beyond the first switch and at a predetermined distance from the saw when it attacks the pipe to thereby primarily determine the length of the sections to be cut off, means for shifting the first switch along said path relatively to the second switch, and control means including the second switch automatically operative to actuate said shifting means and so cause the first switch to be moved to a new position relatively to the second switch for the ensuing cutting cycle whenever the first switch is so disposed as to actuate the saw in improperly timed relation to the movement of the pipe to cut off a section of the desired length.

5. In combination with a flying saw assembly adapted to cut continuously generated pipe into sections and including a flag switch in the path of the pipe for actuating the saw when closed by the leading end of the pipe, a second flag switch adapted for securement in said path beyond the first switch and at a predetermined distance from the saw to thereby primarily determine the length of the sections to be cut off, means including a reversible motor operable to shift the first switch along said path in either direction, a third switch associated with the saw actuating mechanism adapted to close following the closing of the first switch, and control means including the second and third switches automatically operative whenever the second and third switches do not close in synchronism during the cycle incident to the cutting of each section of pipe to energize the motor to move the first switch to a new position for the ensuing cycle.

6. Control means operative to automatically maintain substantial equality in the length of the sections cut consecutively from a continuously generated pipe by a flying saw assembly actuated by engagement of the pipe with a switch disposed in the path thereof, including means comprising a reversible motor operable to move said switch along said path in either direction, a second switch adapted for securement in said path at a point more remote from the saw than the first switch and likewise adapted for actuation by the pipe, and means including the second switch operative to energize the motor to move the first switch to a new position whenever during the cycle incident to the cutting of a section of pipe the saw fails to make the cut just as the pipe actuates the second switch whereby the first switch is moved incrementally during succeeding cycles until the second switch will be so engaged.

7. Control means operative to automatically maintain substantial equality in the length of the sections cut consecutively from a continuously generated pipe by a flying saw assembly actuated by engagement of the pipe with a switch disposed in the path thereof, including means comprising a reversible motor operable to move said switch along said path in either direction, a second switch adapted for securement in said path at a point more remote from the saw than the first switch and likewise adapted for actuation by the pipe, and means including the second switch operative to energize the motor to move the first switch to a new position whenever during the cycle incident to the cutting of a section of pipe the saw fails to make the cut just as the pipe actuates the second switch whereby the first switch is moved incrementally during succeeding cycles until the second switch will be so engaged, said control means then keeping the motor de-energized as long as operating conditions remain constant but being again effective to move the first switch in like manner upon a change in the velocity at which the pipe is delivered to the saw.

8. Control means operative to automatically maintain substantial equality in the length of the sections cut consecutively from a continuously generated pipe by a flying saw assembly actuated by engagement of the pipe with a switch disposed in the path thereof, including means comprising a carriage supporting said switch, means paralleling said path and forming a track for the carriage, a reversible motor and a driving connection between the motor and carriage whereby to move the switch in either direction along said path when the motor is energized, a second switch adapted for securement in said path beyond the first switch and likewise adapted for actuation by the pipe, means including the second switch and a pair of relays respectively adapted when energized to complete a circuit through the motor to cause it to turn in one direction or the other, and means for selectively actuating said relays in accordance with the direction in which the first switch should be moved with relation to the second switch to bring the length of the sections being cut off more closely to the desired length as primarily determined by the setting of the second switch.

9. In combination with a flying saw assembly adapted to cut continuously generated pipe into sections and including a switch in the path of the pipe adapted when closed by its leading end to initiate the cutting cycle, control means operable to shift the position of said switch in said path including a reversible motor and driving connections between it and the switch, a second switch in said path beyond the first switch also adapted to be closed by the end of the moving pipe, a pair of relays respectively operable to close circuits through the motor to drive it in one direction or the other and thereby correspondingly move the first switch, means automatically operative to actuate said relays selectively whenever the time required for the pipe to actuate said switches consecutively differs from that required for the saw to complete its cut after the pipe closes the first switch, and manually operable means for selectively actuating said relays to energize the motor independently of said last mentioned means.

10. In combination with a flying saw assembly adapted to cut sections consecutively from a continuously generated pipe and including a switch in the path of the pipe adapted for actuation by its leading end to cause the saw to perform a cutting cycle, control means operative to automatically maintain substantial equality in the length of the sections comprising a second switch in said path beyond the first switch and likewise adapted for actuation by said leading end, means including a reversible motor interconnected with the first switch operable to shift it in either direction to a new position in said path, and means automatically effective to energize the motor in a predetermined direction and so re-position the first switch for the next cutting cycle whenever during a given cycle the time lag between actuation of the first switch and the cutting of the pipe is greater or less than that required for the pipe to thereafter actuate the second switch.

11. In combination with a flying saw assembly adapted to cut consecutive sections from a continuously generated pipe comprising a switch in the path of the pipe for actuation by the leading end of the latter to initiate the cycle incident to the cutting of each section, control means operative to maintain substantial equality in the length of the sections cut off including a second switch in said path beyond the first switch likewise for actuation by the end of the pipe, means associated with the first switch operable to move it along said path in either direction with relation to the second switch, and means adapted to energize said last mentioned means to re-position the first switch whenever the time lag between its actuation and the cutting off of a given section differs from that required for the pipe to travel between the two switches.

LELAND R. MANSELL.